United States Patent
Dietz

(10) Patent No.: US 8,898,235 B2
(45) Date of Patent: Nov. 25, 2014

(54) METHOD AND DEVICES FOR MESSAGE DISPOSITION NOTIFICATION AFTER SESSION TERMINATION

(75) Inventor: Geoffrey Dietz, Hoffman Estates, IL (US)

(73) Assignee: Infinite Convergence Solutions, Inc., Arlington Heights, IL (US)

(*) Notice: Subject to any disclaimer, the term of this patent is extended or adjusted under 35 U.S.C. 154(b) by 16 days.

(21) Appl. No.: 13/552,127

(22) Filed: Jul. 18, 2012

(65) Prior Publication Data

US 2014/0025751 A1    Jan. 23, 2014

(51) Int. Cl.
    *G06F 15/16* (2006.01)
(52) U.S. Cl.
    USPC .......................................................... 709/204
(58) Field of Classification Search
    CPC ..................... H04L 12/581; H04L 41/026

USPC .................. 709/204–207, 227–229
See application file for complete search history.

(56) References Cited

U.S. PATENT DOCUMENTS

| 7,765,267 | B2* | 7/2010 | Ryan et al. ................ 709/206 |
| 8,020,105 | B1* | 9/2011 | Lemay et al. ............. 715/746 |
| 8,401,154 | B2* | 3/2013 | Boni et al. .................. 379/45 |
| 2004/0189698 | A1* | 9/2004 | Bokish ....................... 345/751 |
| 2008/0141146 | A1* | 6/2008 | Jones et al. ................ 715/753 |
| 2009/0063645 | A1* | 3/2009 | Casey et al. ............... 709/206 |
| 2009/0204681 | A1* | 8/2009 | Sun ............................ 709/206 |
| 2010/0153505 | A1* | 6/2010 | Oh et al. ................... 709/206 |
| 2012/0089680 | A1* | 4/2012 | Ono et al. ................. 709/204 |

* cited by examiner

*Primary Examiner* — Brendan Higa
(74) *Attorney, Agent, or Firm* — Russell F. Sorber

(57) ABSTRACT

This provides a method as well as a client apparatus and server apparatus which will support sending and receiving a disposition notification to session based messaging clients after the message session has terminated.

2 Claims, 1 Drawing Sheet

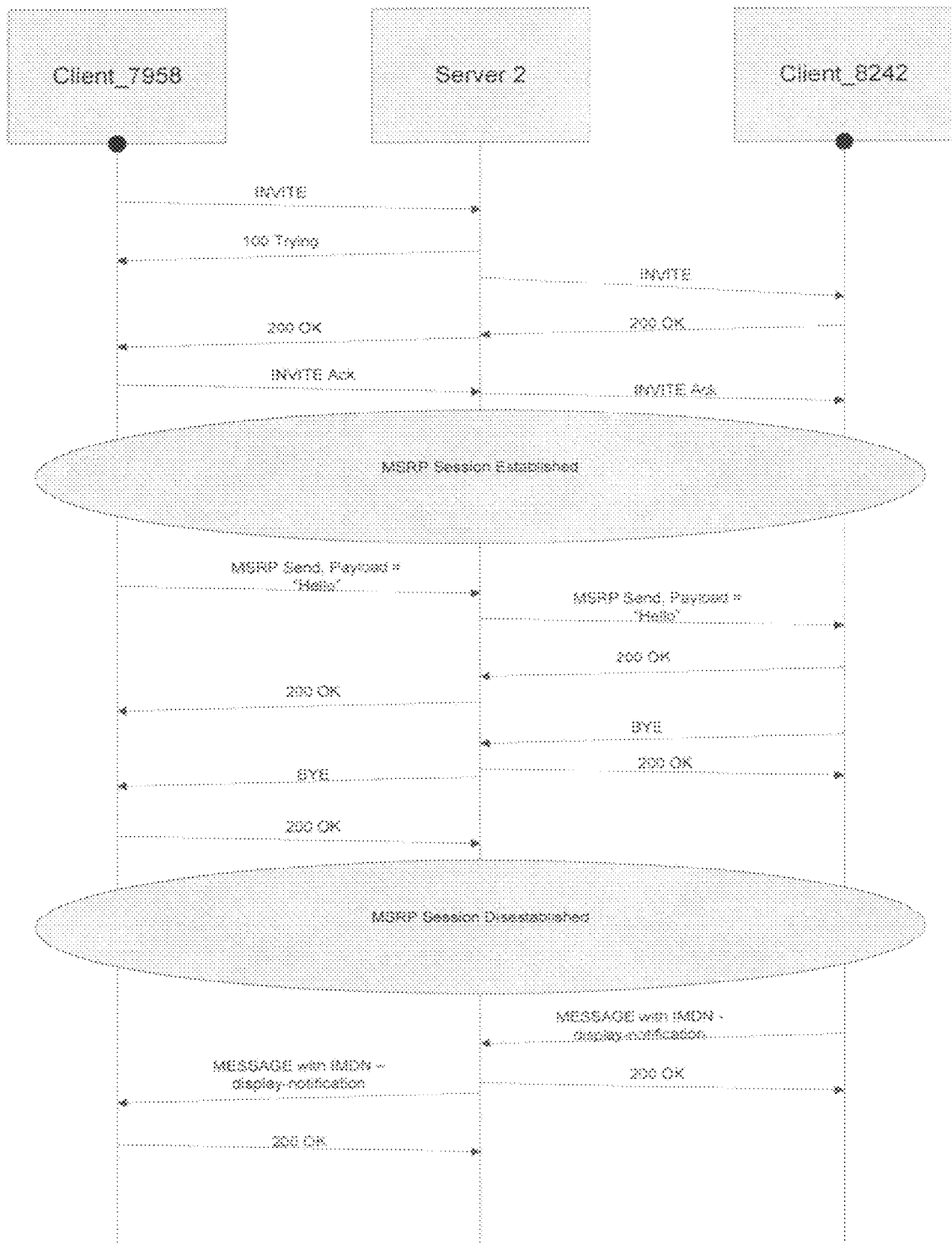

METHOD AND DEVICES FOR MESSAGE DISPOSITION NOTIFICATION AFTER SESSION TERMINATION

CROSS-REFERENCE TO RELATED APPLICATIONS

None.

FEDERALLY SPONSORED RESEARCH

None.

SEQUENCE LISTING

A computer program listing appendix on CD-ROM is incorporated by reference. The CD-ROM appendix contains a single MS-WindowsXP compatible ASCII text file named "Example2_IMDN_After_Session.txt" This file is of size 5 KB written to CD-ROM on Sep. 20, 2012.

FIELD OF THE INVENTION

This invention relates to a new telecommunications method to send message disposition notifications as well as messaging clients and servers which support that method.

BACKGROUND OF THE INVENTION

In RFC 3261, the Internet Engineering Task Force (IETF) described Session Internet Protocol (SIP), an application-layer signaling protocol for creating, modifying, and terminating sessions with one or more participants.

SIP can be and is used to setup a series of related instant messages between two or more parties which are part of a "message session", that is, a conversational exchange of messages with a definite beginning and end. A paging session offers several advantages over stand-alone "page-mode" or "large message mode" messaging including higher security as well as the "presence" indicator to show the status of the recipient as well as the willingness of the recipient to receive a message prior to sending of the message.

This is in contrast to individual messages each sent independently. Using an extension to the SIP protocol, SIP can also be used to send standalone Messages via the SIP message MESSAGE as documented in IETF RFC 3428.

Messaging schemes that track only individual messages can be described as either "page-mode" messaging or "large message mode" messaging, whereas messaging that is part of a "session" with a definite start and end is called "session-mode" messaging.

One common session based protocol which uses SIP to setup the session, is known as Message Session Relay Protocol (MSRP).

In spite of the advantages of session based messaging, there are classes of instant messages which are not always easily handled within the session, especially in a mobile client environment. This includes Instant Message Disposition Notification (IMDN) messages.

Disposition notifications may, for example, include a message delivery notification, a display notification (also known as "read report"), a deletion notification of the message, or the notification that the recipient has refused to provide a message disposition to the sender of the origin al message.

In a mobile environment, minutes, hours or days may pass between the original sending of the message and the time when the message disposition is known for every recipient. This could be due to temporary or permanently leaving a radio coverage area, power cycle of one of the client devices, interruption of service due to insufficient funds or other reasons. After this hiatus, one or more of the message recipients are very likely no longer in the original session. Current art supports stand-alone page-mode disposition notifications in response to stand-alone page-mode messages and current art also supports disposition notification while all parties are still in a paging session. However, the current art does not address sending a disposition notification to a session based messaging client once the original session has terminated to one of the clients. This represents a serious functional loss to the end user for a situation that is common in a mobile environment.

Reestablishment of the same session merely to send the disposition notification is not supported. This method would also add the inefficiency of session setup and teardown even if this method was supported by the known art.

A related problem is that the message ID used in the disposition notification may not be sufficient to route to the proper server for an operator that has multiple instant message servers (and thus several sets of message IDs) or for an operator that may reuse message ID's over a period of time between the message being sent and the disposition notification.

What is needed is a way to send a disposition notification in response to a message sent in a message session, where the disposition can be sent after a message session has ended. What is also needed is a method way to associate the disposition message with the original server and original session. These are the problems solved by this invention.

SUMMARY OF INVENTION

This provides a method and devices for sending of disposition notifications for a session based messaging client after the session has terminated.

Disposition messages are a notification from the receiver of a message back to the sender that a previously sent message has been delivered, read, processed, or displayed or that any of several errors have occurred.

GLOSSARY

Contact A field in the message header that shows one (or more) addresses that can be used to contact the user.
Feature Tag A field that is used by the client to convey to another client capabilities and features which are supported (e.g. that audio, video, chat or other services are supported).
IETF Internet Engineering Task Force.
IMDN Instant Message Disposition Notification
MESSAGE MESSAGE (all uppercase) indicates a SIP command as described by RFC 3428.
MSRP Message Session Relay Protocol, a protocol for transmitting a series of related instant messages in the context of a session.
RFC IETF Request for Comments Document.
SDP The Session Description Protocol (SDP) is a format for describing streaming media initialization parameters.
SIP Session Internet Protocol.

BRIEF DESCRIPTION OF DRAWINGS

FIG. 1 shows a SIP and MSRP message flow of a session based message which uses SIP to setup a MSRP session between Client 7958 and Client 8242 via a server labeled "server 2." Once the MSRP session is established, Client 7958 initiates a "Hello" payload message to Client 8242 via the server. After the "Hello" is received by 8242, a BYE message is sent resulting in the MSRP session being terminated. Sometime after the session is terminated, the user associated with Client 8242 reads the message and a standalone SIP protocol MESSAGE is used to send a Instant Message Disposition Notification (IMDN) display-notification from client 8242 to Client 7958 via the server to acknowledge that the original "Hello" message was read.

File "Example2_IMDN_After_Session.txt" found in the CD-ROM appendix shows a sample listing between the server and client 8242.

The messaging traffic between the server and client 7958 is not shown in the listing.

Starting at line 1 through line 35 of the listing is the INVITE message from server (initiated by client 7958) to client 8242.

From line 38 to 64 is the OK response from client 8242.

Lines 67 through 79 shows the INVITE ACK message from client 8242.

Lines 82 through 103 show the MSRP SEND payload message from the server to client 8242 containing the message "Hello"

Lines 107 through 111 show the OK message from client 8242 to the server acknowledging the MSRP SEND.

Lines 115 through 127 show the SIP BYE message which terminates the MSRP session.

Lines 129 through line 158 shows the Instant Message Disposition Notification after the session has been terminated. Note the use of SIP message MESSAGE and the contact header field in the SIP MESSAGE on line 130 sip: 00E77A6C00EF000001060001@iot1ext1.infinite.com which the client can use to correlate to the correct server and chat session, as well as the use of the CHAT feature tag:

g.oma.sip-im on line 137 neither of which are present in page-mode disposition messages.

Those with skill in the art will recognize that the contact addresses will vary with the particular SIP device and that other CHAT feature tags such as urn%3Aurn-7%3A3gpp-application.ims.iari.rcse.im can also be used to indicate that the disposition notification is associated with a previous chat session.

DETAILED DESCRIPTION

In the best mode, a message session, such as Message Session Relay Protocol (MSRP), is established using well known SIP messages.

A message is delivered to one or more clients within the messaging session as is also well known in the art.

If the messaging session is still active to the client while the disposition of the message is known, the solution transports a disposition notification such as a Delivery Report and/or Read using MSRP SEND messages from the message client recipients as is also known in the art.

However, If disposition of the message delivered in the session is unknown when the session ends, the client and then the intermediate server will send disposition notification to the out of session clients by use of a standalone disposition notification.

The standalone disposition notification could use the SIP message MESSAGE as described in RFC 3428.

The chat "feature tags" (such as g.oma.sip-im or urn%3Aurn-7%3A3gpp-application.ims.iari.rcse.im), instead of the expected page-mode feature tags can optionally be used to indicate that disposition notification is associated with a previous chat session.

In the best mode the SIP Contact Header field can be used by the messaging clients in addition to the message id to associate the message disposition notification with the previously used message session and/or the messaging server.

The SIP Contact address may be used to identify the correct message session and correct server in a multi-server environment, especially where some time may have passed between the sending of the message and the disposition notification, which is often the case in a mobile client environment.

The session based messaging client apparatus will be modified to retain SIP contact addresses (and feature tags) outside of the messaging session for the sending and receipt of the disposition message. The server will also support receiving and sending message dispositions outside for session based messages outside of the session.

What is claimed is:

1. A method to deliver a disposition message to a session based messaging client outside the messaging session comprising the steps of:
    creating a chat messaging session between a first client apparatus and a second client apparatus;
    receiving, by the first client apparatus, a message inside the chat messaging session;
    terminating the chat messaging session;
    sending, after the chat messaging session is terminated, a disposition notification from the first client apparatus to the second client apparatus, wherein the disposition notification contains information associated with the message sent within the chat messaging session;
    receiving the disposition notification by the second client apparatus; and
    associating, by the second client apparatus, the disposition notification with the message sent inside the chat messaging session.

2. A server apparatus comprising:
    a storage device comprising computer executable program code; and
    a processor coupled to the storage device, wherein the processor executes the computer executable program code to direct the server apparatus to:
    receive a message inside a chat messaging session; and
    transmit a disposition notification after the chat messaging session has terminated, the disposition notification containing one or more of a CHAT feature tag, or a contact header field from the chat messaging session, to indicate the disposition notification is associated with the previously terminated messaging session.

* * * * *